(12) United States Patent
Wang et al.

(10) Patent No.: US 6,600,564 B1
(45) Date of Patent: Jul. 29, 2003

(54) DEVICE AND METHOD FOR OPTICAL PATH LENGTH MEASUREMENT

(75) Inventors: Chen-Chia Wang, Newark, DE (US); Sudhir Trivedi; Jacob B. Khurgin, both of Baltimore, MD (US)

(73) Assignee: Brimrose Corporation of America, Baltimore, MD (US)

( * ) Notice: Subject to any disclaimer, the term of this patent is extended or adjusted under 35 U.S.C. 154(b) by 0 days.

(21) Appl. No.: 09/577,308

(22) Filed: May 23, 2000

Related U.S. Application Data

(60) Provisional application No. 60/135,569, filed on May 24, 1999.

(51) Int. Cl.[7] .................................................. G01B 9/02
(52) U.S. Cl. ...................................... 356/484; 356/73.1
(58) Field of Search ................................. 356/73.1, 484

(56) References Cited

U.S. PATENT DOCUMENTS

| | | |
|---|---|---|
| 4,676,645 A | 6/1987 | Taniguchi |
| 4,749,851 A | 6/1988 | Wolffenbuttel |
| 5,153,669 A | 10/1992 | DeGroot |
| 5,444,724 A | 8/1995 | Goto |
| 5,684,586 A | * 11/1997 | Fortenberry et al. ........ 356/345 |
| 5,781,297 A | 7/1998 | Castore |

* cited by examiner

Primary Examiner—Frank G. Font
Assistant Examiner—Andrew H. Lee
(74) Attorney, Agent, or Firm—Max Stul Oppenheimer

(57) ABSTRACT

This invention is a device and method for the measurement of optical path length. A frequency chirped electromagnetic wave source, such as a laser beam, is split into two branches. A reference branch is projected directly onto a photosensor, while a probe branch is launched towards a target whose distance relative to the reference path is to be determined. A reflected wave from the target is collected and mixed with the reference onto a photosensor. Due to the unequal path lengths traveled by the reference and the reflected probe laser beams as well as the chirped nature of their frequencies, a certain optical frequency difference exists between the two beams. This frequency difference is linearly proportional to the relative optical path length difference between the two laser beams and the relative optical path length can be readily determined by using a photosensor that generates photocurrents linearly proportional to the relative optical frequency differences between the reference and reflected branches.

20 Claims, 10 Drawing Sheets

DEVICE AND METHOD FOR OPTICAL PATH LENGTH MEASUREMENT

This application is entitled to and claims the benefit of U.S. Provisional Application of Chen-Chia WANG, Sudhir TRIVEDI, and Jacob B. KHURGIN, for DEVICE AND METHOD FOR OPTICAL PATH LENGTH MEASUREMENT, filed on May 24, 1999 and assigned serial number 60/135,569.

FIELD AND BACKGROUND OF THE INVENTION

1. Field of the Invention

The present invention relates in general to path length measurement, and more particularly to coherent optical path length measurement systems capable of varying degrees of resolution.

2. Background Information

The invention described and claimed herein comprises a novel method and device for measurement of optical path length.

BACKGROUND OF THE INVENTION

There are many optical techniques for the remote measurement of path lengths. They can be categorized into two main groups: direct optical detection and coherent optical detection. In a direct optical detection scheme, a laser pulse is emitted from a probing station toward a remote target from which a return pulse is reflected. The reflected return pulse is collected, and its arrival time relative to the reference time is determined. Because the distance that the pulse travels is equal to the product of the speed of light and the elapsed time, the distance of the remote target from the probing station can be determined simply by measuring the delay time of the reflected laser pulse. The spatial resolution of such direct optical detection schemes is, however, quite limited due to the lack of detection electronics capable of detecting very minute time delays and the very short time delays of the laser pulses.

In a coherent optical detection scheme, the phase coherence properties of a laser emission are exploited to offer information about the relative magnitudes between two path lengths. Interferometers are typically used in this approach, with one arm of the interferometer used as the reference path to gauge the length of the other arm, which contains the object under investigation. Laser emissions traveling through the two branches of the interferometer are combined onto a photosensor, such as a photodiode or a photoconductor, which produces a photocurrent proportional to the overall intensity of the interference pattern. These coherent optical detection techniques can resolve path length differences as small as a fraction of the wavelength of the laser light used.

However, several drawbacks are associated with this technique. First, the interferometer setup requires very stringent optical alignment in order to achieve sufficient mixing of the laser beams inside the conventional photosensor. Second, the technique's resolution is limited; it is a fraction of the laser wavelength and typically on the order of 1 nanometer. Additionally, the photocurrent that is generated by these conventional photosensors is a sinusoidal function that varies with the relative path length difference between the reference path and the object path. As a result, the intensity of the generated photocurrent is the same when the path length difference differs by an integer multiple of the laser wavelength. This ambiguity makes it difficult to determine the path length difference when the reference path and the object path are of significantly different lengths; methods for dealing with this ambiguity require a priori knowledge of the approximate distance being measured, and selection of appropriate components.

SUMMARY OF THE INVENTION

The foregoing problems are overcome, and other advantages are provided by a system, in accordance with the invention, which comprises a laser source and/or dispersive elements which produces a laser emission, either continuous-wave or pulsed in nature, with chirped frequencies and a optical frequency photosensor capable of measuring optical frequency differences between the two interfering laser beams by generating photocurrents linearly proportional to the relative frequency difference between them.

It is an object of the invention to provide a method for measuring distances which is more accurate than conventional methods.

It is another object of the invention to provide a method for measuring distances without a priori knowledge of the approximate distance to be measured.

A principal feature of the invention is the use of chirped frequencies.

Among the advantages of the invention are increased accuracy and autoranging.

These and other objects, features and advantages will be apparent from the discussion which follows. The various features of novelty which characterize the invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which.

DESCRIPTION OF THE PREFERRED EMBODIMENT

The invention utilizes electromagnetic radiation; for simplicity, the description below uses laser emissions as the electromagnetic radiation. Other types could be used, with modifications that would be known by those of ordinary skill in the art.

Figure 6:
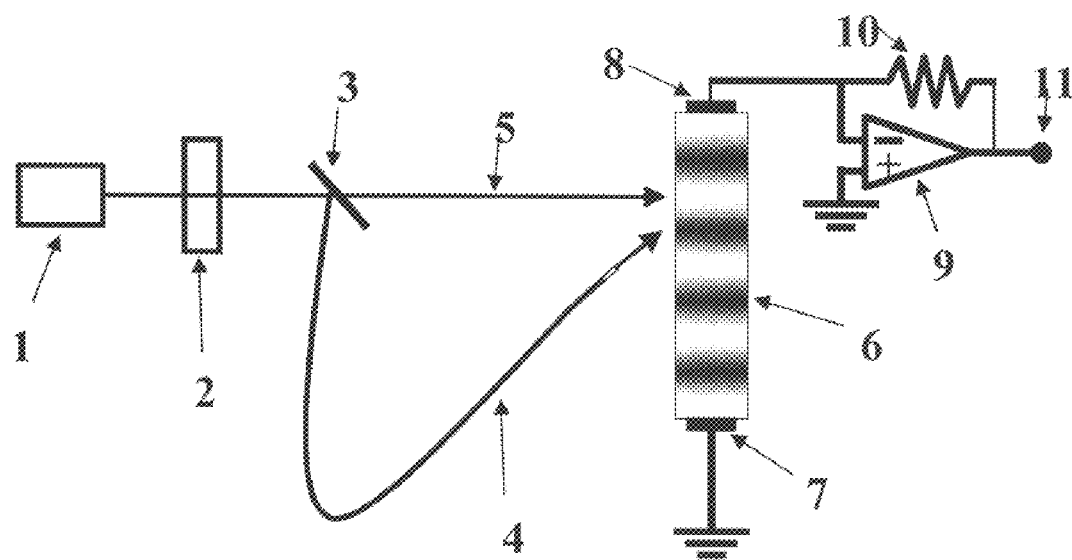
FIG. 6 is a schematic of a second embodiment of this invention for optical path length measurement.

Referring to the drawings, the invention is a novel device and method for measuring optical path length, (and therefore distances), which comprises a laser source and/or dispersive elements which produces a laser emission is used as the electromagnetic radiation), either continuous-wave or pulsed in nature, with chirped frequencies and a optical frequency photosensor capable of measuring optical frequency differences between the two interfering laser beams by generating photocurrents linearly proportional to the relative frequency difference between them, as shown in overview in FIG. 6.

The invention, at its simplest, is made up of a laser source and/or dispersive elements which produces a laser emission, either continuous-wave or pulsed in nature, with chirped frequencies and a optical frequency photosensor capable of measuring optical frequency differences between the two interfering laser beams by generating photocurrents linearly proportional to the relative frequency difference between them.

In the invention, the frequency chirped laser beam is divided into two branches using a beam splitting element. The reference branch of the laser beam travels through a reference path of known length (or of a length which, if not known absolutely, is to be used as a reference unit for determining the length of a second path) and is projected directly onto a photosensor. The probe branch of the laser beam (probing signal beam, or probe beam) is projected toward a remote target for which the path length from the probe station is to be determined relative to the reference path. The light reflected back from that target is collected and also sent to the photosensor.

This interference between the reference beam and the remote beam inside the photosensor produces a frequency difference. The photosensor used in this invention determines the optical difference frequency by measuring the velocity of the resultant optical interference pattern, instead of counting the number of cycles of its intensity variation per unit time. By adopting a photosensor that generates photocurrents linearly proportional to the relative optical frequency differences between the reference and reflected probe laser beams, the relative optical path length can be readily determined. As a result, high precision reading of optical frequency difference can be determined within a short period of time by the photosensor used in this invention. Various degrees of accuracy in resolving path length differences can be achieved using different amount of laser frequency chirp rates. The photocurrent produced is linearly proportional to the difference between the lengths of the reference and probe paths. The value of this proportionality constant is known and is a function of the frequency chirp rate and the speed of light in the transmission medium.

The invention is a device and method for the measurement of optical path length (and, hence, distances in general). Specifically, the invention is based-on Coherence Frequency Domain Reflectometry (CFDR). CFDR is a well-known technique that is widely used for interrogating target distance and surface topographical information in modern microwave Doppler radars and pulsed Doppler radars. It is also used for optical topography and the characterization of break-off point in optical fiber bundles.

In a conventional optical CFDR system, the carrier frequency of the continuous-wave laser beam is linearly chirped in time repetitively. The frequency chirped laser beam is then split into a reference beam and an interrogating laser beam, which is projected towards the target under surveillance. Due to the additional time delay suffered by the laser signal reflected from the target, a finite frequency difference exists between the reference and the reflected signal. The amount of frequency difference is linearly proportional to target distance. For example, the frequency chirp rate of S Hz/sec, a time delay τ suffered by the probe laser beam will generate an optical frequency difference $\Delta f = S \times \tau$ at the said photosensor. $\Delta f$ is defined as the relative frequency difference between the reference beam and the probe laser beam. The corresponding path length difference $\Delta L$ can then be determined as $\Delta L \div c\Delta f/2S$, where c is the speed of light in the transmission media.

By using photodiodes to detect the beat note and electronic spectrum analyzer and/or computation-intensive Fast Fourier Transform (FFT) calculations to decipher the beat frequency, a conventional CFDR system can determine the absolute distance, i.e. |$\Delta L$|, between the remote target and the observation station.

Because the target distance and the surface profile information are encoded onto the optical difference frequency domain, the high speed electronics (>GHz) that are required in direct detection-based optical ranging systems are not necessary for CFDR systems.

The spatial resolution of CFDR systems is limited by the frequency chirp rate of the laser beams as well as the photodetector used to measure the optical beat note frequencies. Short distances and minute surface features can only be measured using a high frequency chirp rate because of the very short time delay produced in these situations. If slow frequency chirp rates were instead used for the minute path length differences, the system would produce a very small optical frequency difference. Thus, highly coherent laser sources for the sensor and long integration times would be necessary for the system to accurately measure short distances and minute surface features using a slow frequency chirp rate.

Conventional techniques for chirping the laser frequency include acousto-optical (AO)) frequency shifters and tunable lasers (solid state and external cavity semiconductor diode lasers). However, the AO shifters suffer from the very limited bandwidth, while the tunable solid state diode lasers require long scanning times (on the order of approximately 0.1 ms). As a result, only modest frequency chirp rates can be obtained with these two methods. Unfortunately, most recent publications indicate that a modest frequency chirp rate of approximately 10$^{17}$ Hz/sec can only be achieved with elaborate and expensive tunable laser designs.

Another disadvantage associated with the conventional CFDR systems is the fact that conventional photodetectors, i.e. photodiodes and photoconductors, are used to count the optical beat note frequencies. These photodetectors are direct detection devices that respond to the intensity of the interference pattern formed by the two parallel laser beams and produce sinusoidal photocurrent with oscillating frequency equal to the optical difference frequency. In addition to the stringent optical alignment conditions that are required for this system, a full cycle in the photocurrent needs to be detected before external circuits/computer calculations can determine the value of the beat note frequency. Thus, small beat note frequencies, which correspond to the resolution of short distances and fine spatial features, can be evaluated only over a very long period of acquisition time (approximately the inverse of the beat frequency). A conventional CFDR system using photodiodes and/or photoconductors is vulnerable to optical path length perturbations caused by ambient environmental changes that deteriorate the achievable spatial resolution. More importantly, the repetition frequency of the chirping signal effectively becomes the smallest frequency resolvable by conventional CFDR systems. As a result, only moderate spatial resolution on the order of 10 $\mu$m was achieved.

To enhance the spatial resolution using CFDR, two issues have to be resolved. The first is to increase the frequency chirp rate beyond what is currently achievable using continuous wave lasers. The second is to devise a method to measure small optical beat note frequencies within a short period of time. For the enhancement of laser frequency chirp rates, it is necessary to scan over a broad light spectrum over a short period of time. Pulsed lasers are natural and logical candidates for this purpose because they have broad spectral width and the pulses last only over a period of time that can be readily shorter than 1 ns.

Dispersive elements like optical fibers and grating pairs can also be used to chirp the frequencies of the laser pulses. Dispersive elements can ensure that different spectral components of the laser pulse emerge at different times, thus achieving linear chirping of laser frequencies. Using a Ti:Sapphire laser that emits pulses of 2 ps duration, laser frequency chirp rates as high as $10^{21}$ Hz/sec are produced by propagating the laser pulses through a stretch of 2-km long single-mode optical fiber. At the exit end of the fiber, the pulse width was broadened to 600 ps via the interaction of self-phase modulation and dispersion.

Figure 1:
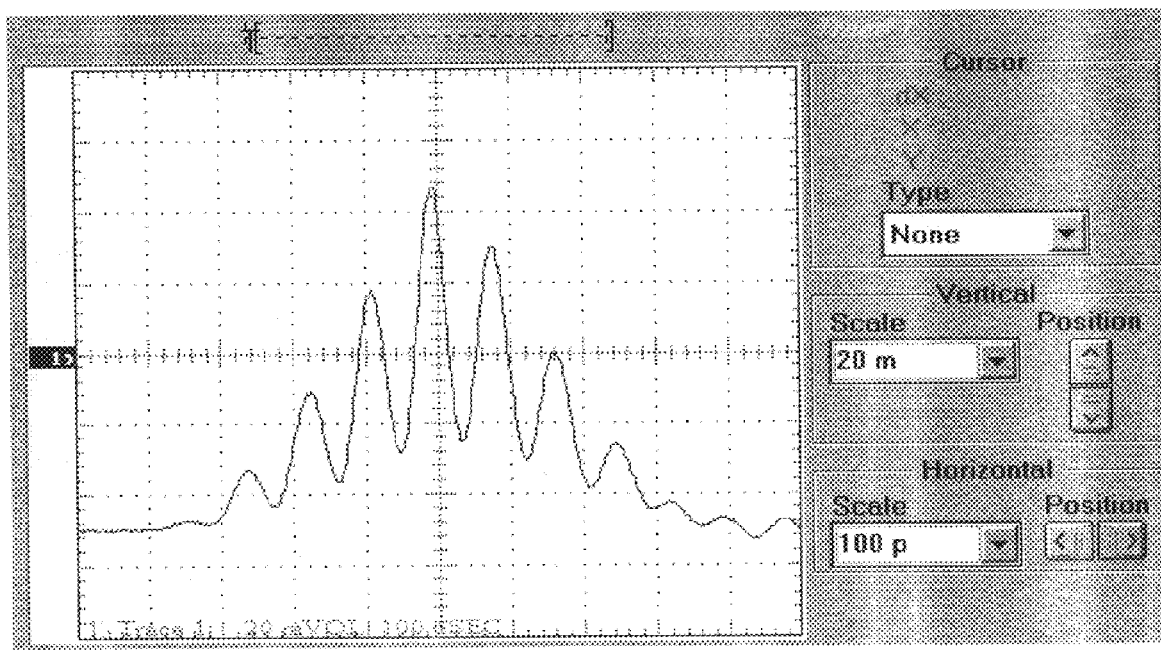
FIG. 1 shows traces from a sampling scope showing the beat note between two frequency chirped pulses with the duration of 600 ps.

FIG. 1 shows the beat note of the chirped laser pulses measured by a Michelson interferometer and a high-speed (50 GHz) photodiode. The beat note frequency varies linearly with respect to the relative time delay between the two interfering laser beams. The ability to resolve minute optical path length differences is dramatically improved with such high frequency chirping rates. For a height difference of 100 pm, the corresponding time delay suffered by the probing laser pulses is approximately $\tau=10^{-18}$ seconds. There are no devices currently available that are capable of detecting such short time delays. Using the CFDR approach with a frequency chirp rate of $S=10^{21}$ Hz/sec, the corresponding optical beat note frequency is given by $\Delta f=S\times\tau=1$ kHz.

Conventional photodiodes or photoconductors cannot resolve such slow beat notes simply because they cannot sense one complete cycle of the beat note within a time duration as short as 600 ps. As a result, the electronic spectrum analyzer and/or FFT calculations cannot identify the beat note frequency, and it is impossible to determine small optical path lengths.

The optical frequency photosensor used in this invention measures the relative optical frequency differences between two interfering laser beams not by counting the cycles, but instead by sensing the motion of the optical interference pattern and generating photocurrents that are linearly proportional to the relative frequency difference between the two laser beams. The characteristic response time of these sensors is typically on the order of 1 $\mu$s, but response times as short as 100 ns have been observed. As a result, the photosensor can respond to the accumulated effects of multiple laser pulses by measuring the average of the optical frequency differences. Thus, when using this technique, long integration times are not required for the detection of slow optical beat frequencies.

Figure 2:
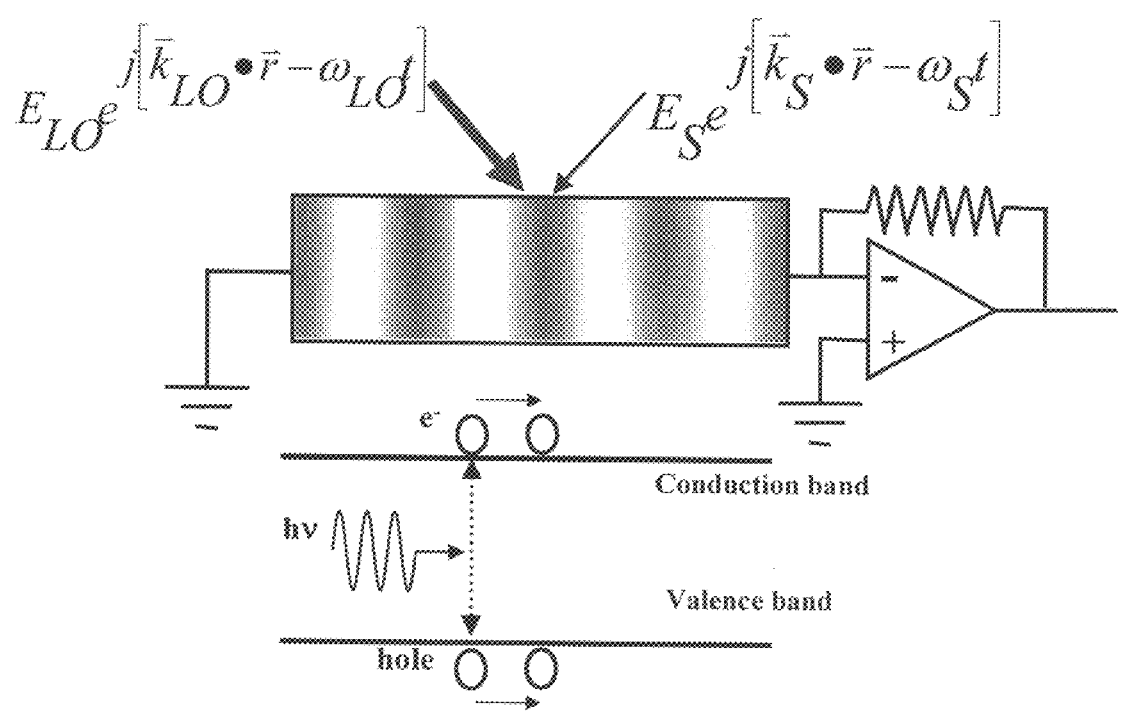
FIG. 2 is a schematic drawing describing the physical mechanisms involved in establishing an internal space charge electric field inside a novel optical Doppler frequency sensor.

FIG. 2 shows the physical mechanisms involved in the behavior of the said optical Doppler frequency photosensor. The reference and signal laser beams intersect with half angle $\theta$, which is typically on the order of approximately 1° to form an interference pattern inside the photosensor. As the incident photons are absorbed by the photosensor, free charge carriers (electrons and/or holes) are generated. Because more of these free charge carriers are generated in the brighter regions of the optical interference pattern than in the darker regions, a charge carrier concentration gradient is formed. Diffusion of these free charge carriers ensures that an internal space charge electric field is established due to the nonzero concentration gradient and the fact that charge neutrality has been locally destroyed. This prevents any further diffusion of free carriers in the steady state.

A detectable photocurrent is generated by free charge carriers trying to follow the motion of the optical interference pattern caused by, for example the non-zero relative frequency difference between the probe and reference laser beam. Because the direction of motion of the optical interference pattern is determined by the relative optical frequency difference between the two laser beams, the polarity of the resultant photocurrent is an unambiguous indicator of the relative magnitudes of the frequencies of the interfering optical fields. Thus, the polarity of the photocurrent generated when the signal laser beam has a smaller frequency than the reference beam is opposite to that generated when it oscillates with a higher frequency than the local reference laser beam, an inherent capability of directional discrimination for the moving space charge field optical Doppler frequency detectors. No photocurrent is generated if the two optical fields have identical frequencies because the optical interference pattern is stationary.

In the presence of two interfering laser beams which form an optical interference pattern with grating spacing ^ and moves with the velocity of $v=\omega_D/K_g$ where $\omega_D=\omega_{LO}-\omega_S$ is the relative frequency difference between the optical fields and $K_g=2\pi/V$ is the wave number of the interference pattern. The corresponding steady state photocurrent is given by:

$$\Sigma_{,DC}(\omega_D) = \frac{2P_S P_{LO}}{(P_S + P_{LO})} \times \frac{\sigma_O E_O}{(1 + E_D/E_q)(1 + E_D/E_M)} \times \frac{\omega_D \tau_g}{1 + (\omega_D \tau_g)} \quad (1)$$

where $\sigma$ is the photoconductivity, $P_{LO}(P_S)$ is the optical power density, $E_D=k_B T K_g/e$ is the diffusion field, $E_M=(\mu_e \tau_e K_g)^{-1}$ is the Maxwell field, $E_q=eN_A/\epsilon_0\epsilon_r K_g$ is the screening field, and $\tau_g=\tau_M(1+E_D/E_M)/(1+E_D/E_q)$ is the grating formation time, or the response of the said optical Doppler frequency sensors. The electron mobility-lifetime product is denoted as $\mu_e \tau_e$, NA represents the deep level trap concentration, and $\tau_M=\epsilon_0\epsilon_r/\sigma_0$ is the dielectric relaxation time and the sensor's RC time constant. Equation (1) represents a DC signal because a space charge electric field moving with constant speed drifts free charge carriers steadily out of the semiconductor. The directional discrimination capability of moving space charge field photodetectors is clearly shown by the fact that $j_{\Sigma,DC}(\omega_D)$ is non-symmetrically dependent on the relative optical frequency difference $\omega_D$.

When the optical interference pattern moves slowly, however, free carriers easily follow its motion. The photocurrent generated by the presence of these free carries is proportional to the relative frequency difference between the laser beams. Thus, for this situation $\omega_{D\tau_g}<<1$, and Equation (1) can be approximated as:

$$j_{\Sigma,DC}(\omega_D) \approx P_S \frac{2P_{LO}}{(P_S+P_{LO})^2} \times \frac{\epsilon_0\epsilon_r E_D}{(1+E_D/E_g)^2} \times \omega \qquad (2)$$

Equation (2) demonstrates this inherent directional discrimination capability of the optical Doppler frequency sensors. Note that a blue shift and a red shift in the frequency of the probe laser beam result in photocurrents with opposite polarities.

Figure 3:
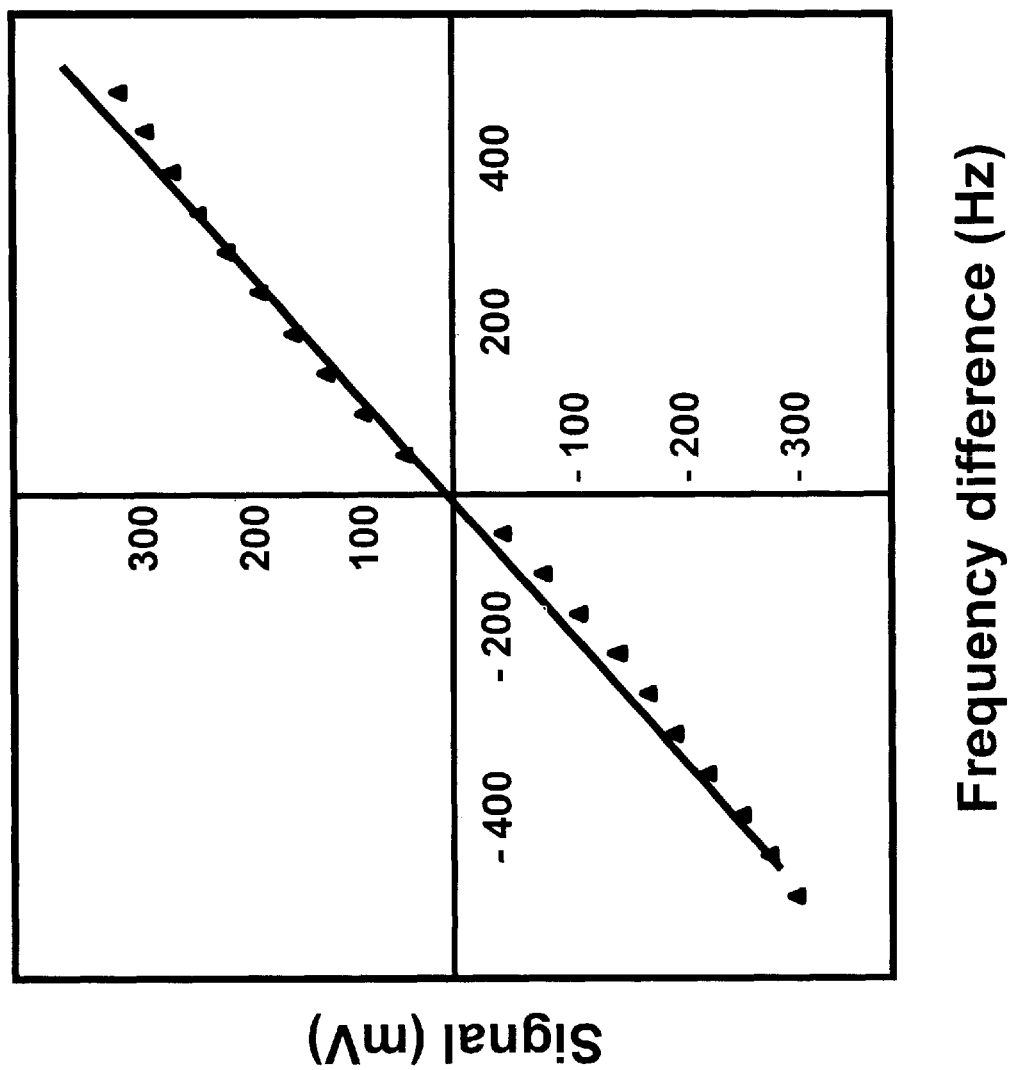
FIG. 3 is a graph of the measured linear dependence of photocurrent on the Doppler shift for CdTe:V sample, collected when the Doppler frequency shift is within the detection bandwidth of the moving space charge field Doppler frequency detector.

FIG. 3 shows that the current output is linearly proportional to the Doppler frequency shift when the Doppler frequency shift is within the detection bandwidth of the photosensor. By measuring the photocurrent generated by the optical Doppler frequency sensor, the relative optical frequency difference between two laser beams can be determined without using electronic spectrum analyzers and/or FFT calculations. Furthermore, the photosensor can measure the beat note frequency within a characteristic response time that is independent of the frequency difference between the interfering laser beams. As a result, long integration times are not required. The typical photosensor used in this invention can determine optical difference frequencies in the range from zero to to several hundreds of kilohertz with a sensitivity better than 10 Hz.

Figure 4:
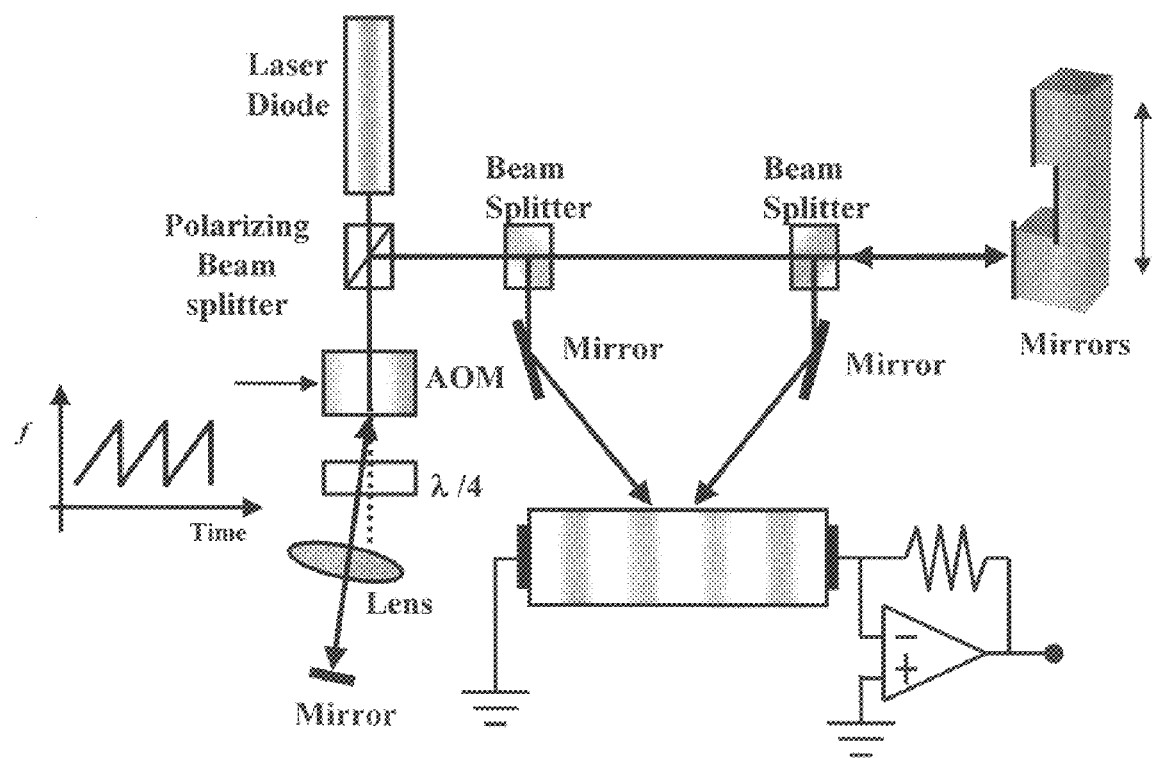
FIG. 4 is a schematic of one embodiment of the invention. λ/4: quarter-wave plate, AOM: acousto-optic modulator.

FIG. 4 is one embodiment of the optical path length measurement device. A continuous-wave laser source, in this case a semiconductor diode laser with the wavelength of 830 nm, generates the laser beam. The desired frequency chirping is created using an acousto-optic modulator driven by sinusoidal radio frequency signals. The frequency chirped laser beam is split into two branches by a beam splitter. The reference laser beam is guided towards the photosensor while the probe beam is projected onto the remote object of interest. The reflected laser beam is collected and sent to interfere with the reference in the photosensor.

Figure 5:
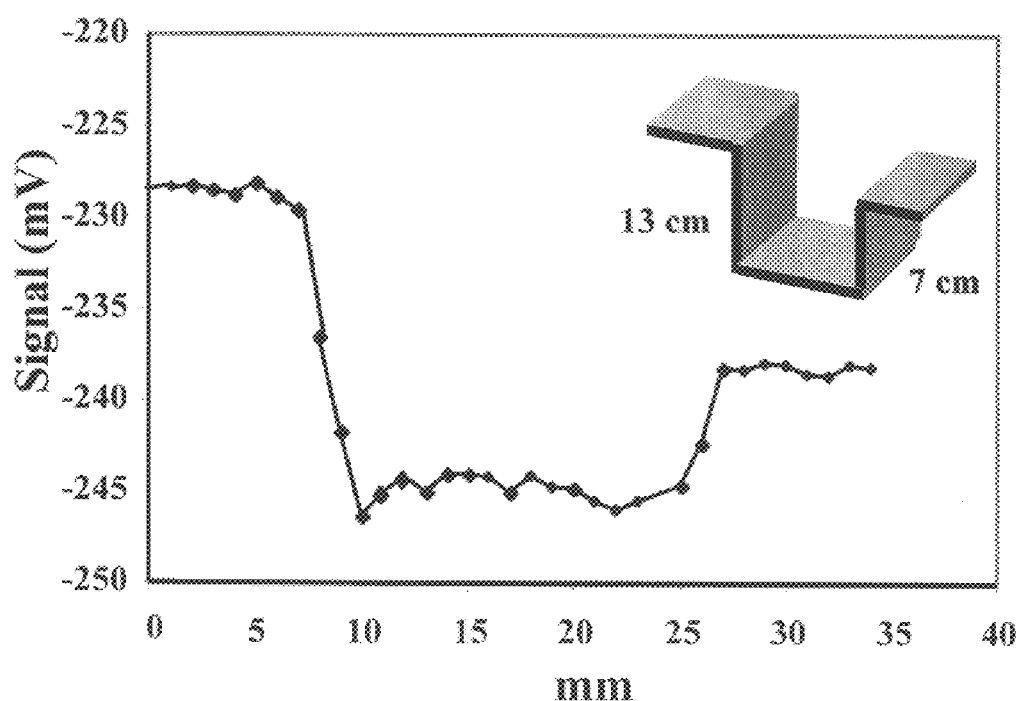
FIG. 5 is a graph of the photovoltage signals generated by the photosensor in this invention as the signal laser beam scanned over the surface of the asymmetric mirror array.

FIG. 5 shows the photovoltage experimentally generated by the optical frequency photosensor. A frequency chirp rate as small as $S \cdot 10^{11}$ Hz/sec was generated using an acousto-optic modulators (AOMs) capable of low bandwidth. The remote object that was analyzed consists of an asymmetric array of mirrors with step heights of 7 cm and 13 cm. As the probe laser beam scanned the mirror array, the photosensor generated photocurrents that closely resembled the surface contour of the mirror array. The slow decent and accent of the measured photovoltage signals are caused by the finite spot size (approximately 5 mm) of the probe laser beam.

FIG. 6 shows an embodiment of this invention using pulsed laser sources. In this embodiment, a laser source (1) emits laser pulses with short time duration. A dispersive mechanism or a frequency chirping mechanism (2) is used to produce the necessary ramping in the laser frequency by causing the various spectral components of the laser pulses to emerge at different times. This frequency chirping mechanism (2) is either an external means such as a stretch of optical fiber or an internal means such as direct modulation of the bias current being applied to the laser source (1). A beam splitter then splits the frequency chirped laser pulses into two laser beams, a local reference beam and a probe signal beam, by the beam-splitting element (3). The probe laser beam passes through an optical path (4) while the local reference laser beam travels through the reference optical path (5). Both the local reference and the probe laser beams are then brought to interference inside the optical frequency sensor (6). The frequency sensor (6) is a typically a semiconductor device that typically has two electric contacts (7) and (8) through which photocurrents flow. The contacts (7) and (8) are typically of the same electric potential but an alternating external bias electric field can be applied in some situations to manipulate the magnitude of the generated photocurrents. These photocurrents can be detected by an electronic circuit such as a transimpedance amplifier (9) with a feedback resistor (10), which produce voltage signals at the output terminal (11).

Figure 7:
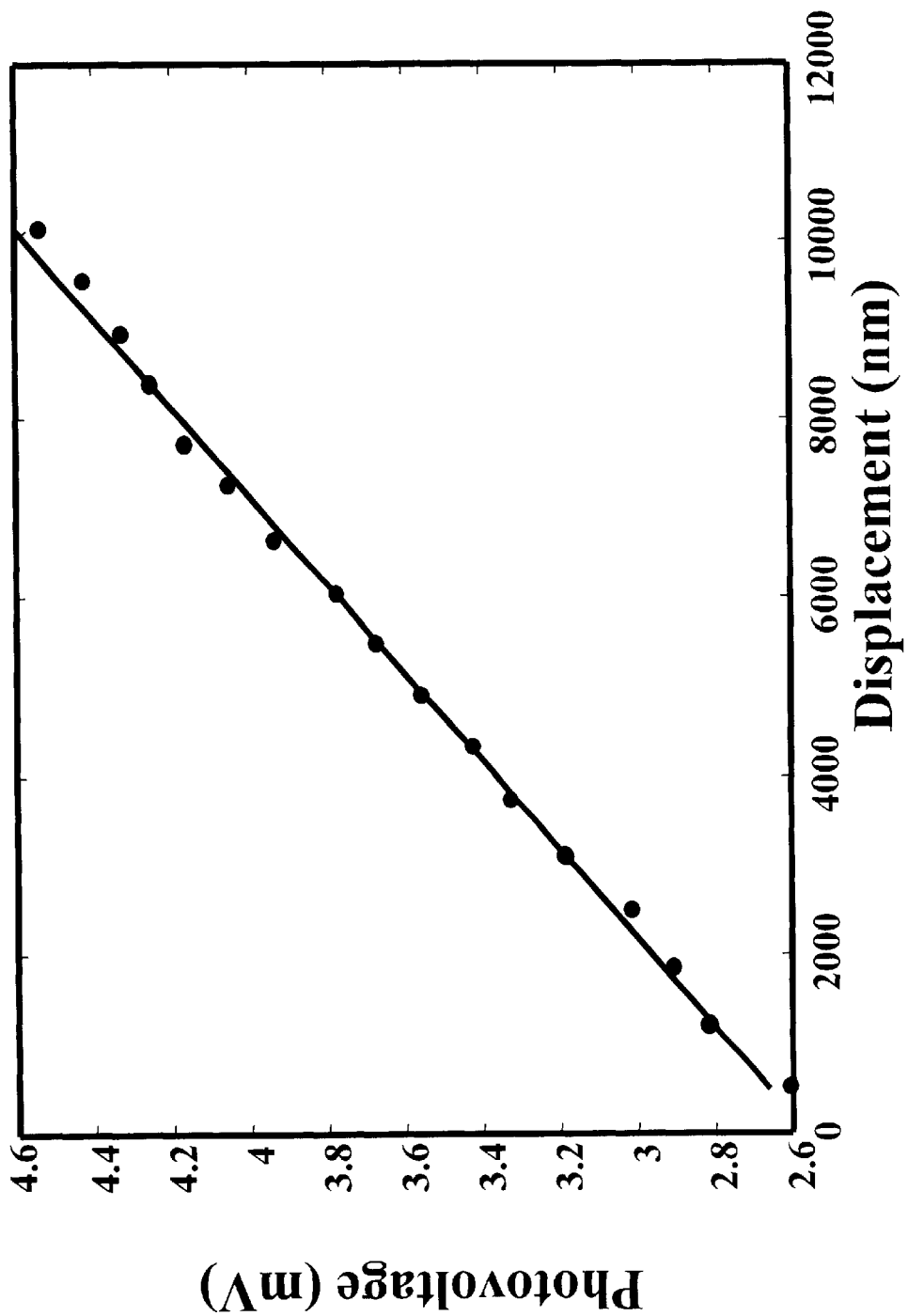
FIG. 7 is a graph of the experimentally measure voltage data as a function of the path length difference between the two laser beams. The solid line is a linear curve fitting.

FIG. 7 depicts experimentally collected photocurrent data as a function of the path length difference between the two laser beams. In this experiment, a semiconductor diode laser is ON-OFF modulated by a square wave driving current with the repetition frequency of 1 MHz. Frequency chirping of the beam occurs naturally as the diode laser undergoes this pulsed modulation. Note that, instead of using an expensive and complicated tunable continuous-wave laser, a frequency chirp rate on the order of $10^{17}$ Hz/sec was achieved, with a low cost, low power semiconductor diode laser. Using a highly sensitive CdTe:V crystal, we achieved spatial (step height) resolution on the order of 250 nm.

Figure 8:
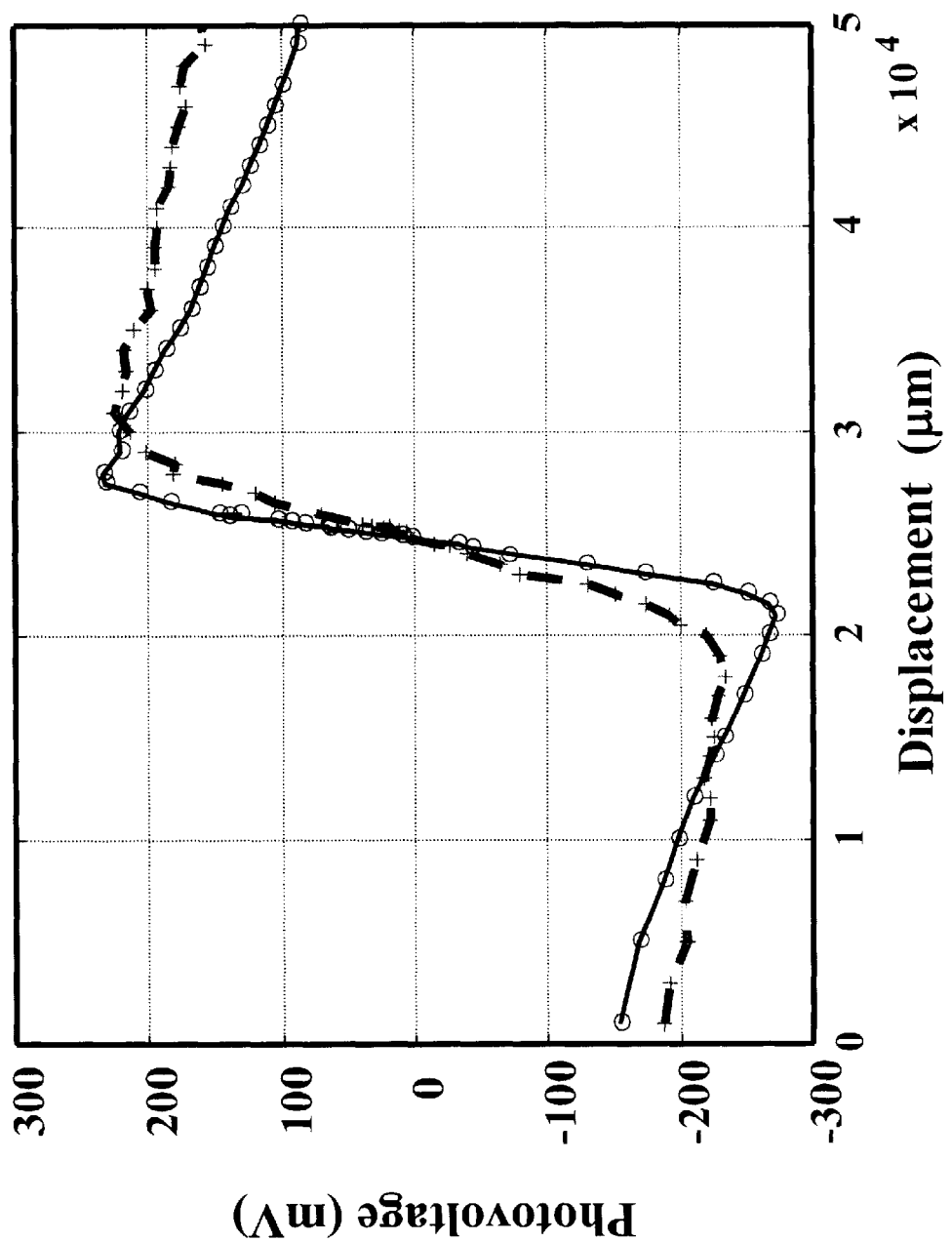
FIG. 8 is a graph of the photocurrent versus optical path length difference characteristic curves for two different frequency chirp rates. O: ∥ 1.5×10$^{17}$ Hz/sec,+: S=0.8×10$^{17}$ Hz/sec.
Figure 9:
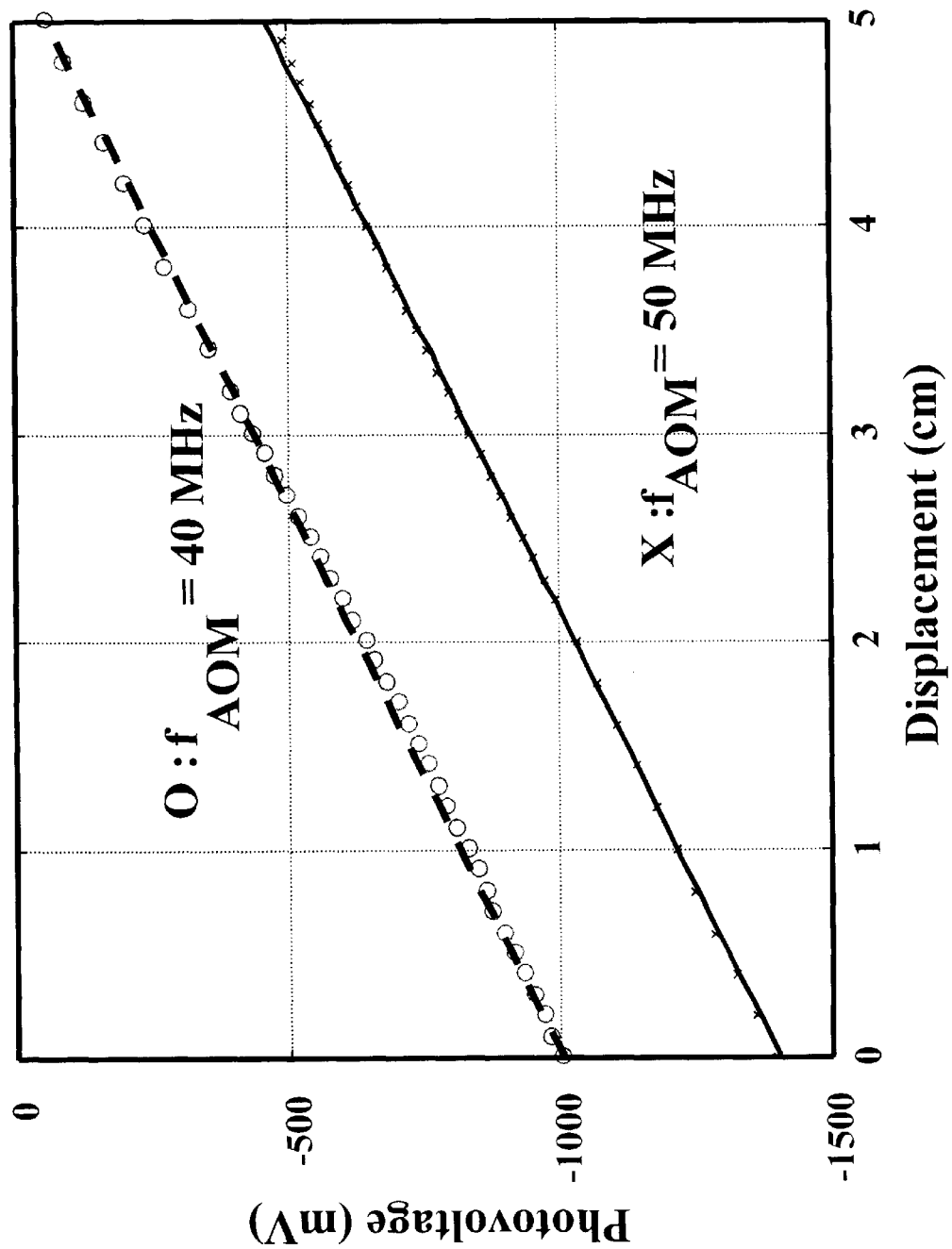
FIG. 9 shows the measured photovoltage versus displacement characteristic curves taken from a CdTe:V sample when the reference laser beam was subjected to different amounts of frequency shifts.

FIG. 8 shows the photocurrent versus displacement characteristic curves for a different CdTe:V sample taken under two different frequency chirp rates. Better spatial resolution was achieved the higher frequency chirp rate of $S=1.5 \times 10^{17}$ Hz/sec, as shown by the steeper slope in the photocurrent versus displacement curves. Based on the presented experimental data, it is expected that a spatial resolution of 25 pm can be achieved with a frequency chirp rate of $S=1.5 \times 10^{22}$ Hz/sec FIG. 9 shows the measured photovoltage versus displacement characteristic curves taken from a CdTe:V sample when the reference laser beam was subjected to different amounts of frequency shifts. The observation range of the optical path length measurement system is the baseline path length difference between the two optical paths. Because the path length difference information is encoded onto the optical difference frequency domain in this invention, the observation range can be manipulated by the introduction of additional frequency shifts to the reference laser beam. By passing the reference laser pulse train through an acousto-optic modulator driven by a sinusoidal signal with the frequency $f_{AOM}$ the frequency of the reference laser beam suffers an additional frequency shift of $f_{AOM}$ FIG. 9 demonstrates that by increasing the additional frequency shift to 50 MHz, the characteristic curve obtained when $f_{AOM}=40$ MHz can be reproduced by moving the remote object further away by 2.24 cm.

The observation range of the optical path length measurement apparatus in this invention can be significantly increased by employing the inter-pulse mixing technique. In this approach, the reference and probe pulses originate from different laser pulses. For example, assume the probe pulse stems from the $1^{st}$ laser pulse while the reference pulse comes from the $(N+1)^{th}$ laser pulse. Under such circumstances, there exists a baseline time difference of N×T, where T is the laser pulse period, between the reference and probe laser pulses when they interfere inside the said Doppler frequency photosensor in this invention. As a result, the observation range is now increased to case $L_{base}=c \times N \times T$, where c is the speed of light in the transmission media. The frequency difference between the probe and reference laser pulses sensed by the photosensor reveals the differential path length difference, $\Delta L$, and the total path length difference between the two paths now becomes $(L_{base}+\Delta L)$.

Figure 10:
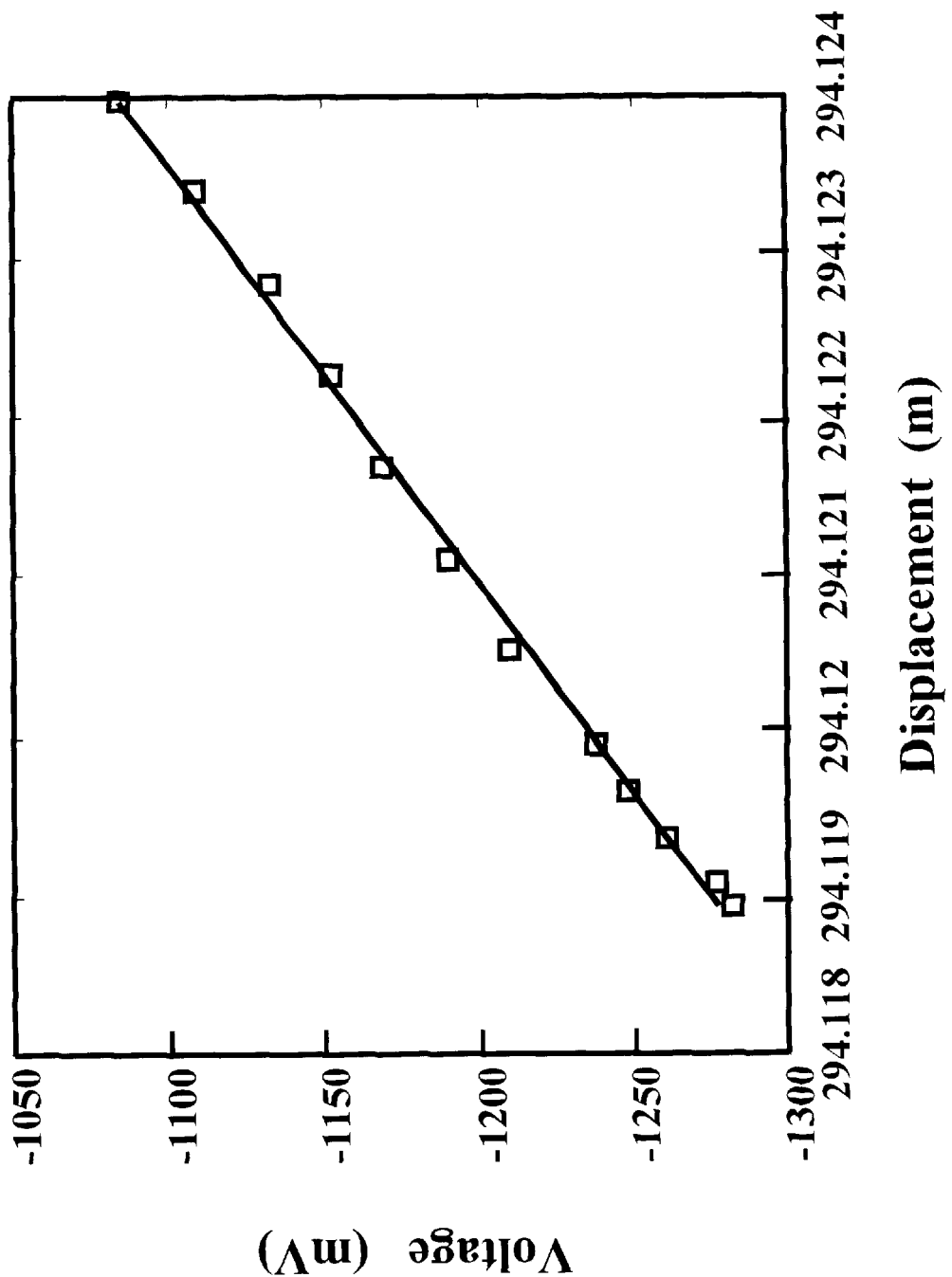
FIG. 10 shows the measured photovoltage versus path length difference when the interference pattern is written by the 1$^{st}$ probe pulse and the 10$^{th}$ reference pulse.

FIG. 10 shows the measured photovoltage versus path length difference when the interference pattern is written by the $N^{th}$ probe pulse and the $(N+9)^{th}$ reference pulse. A spatial resolution on the order of 100 $\mu$m is estimated. The laser pulse frequency is 10 MHz and, as demonstrated by FIG. 10, the length of the probe path is now approximately 294 meters longer than that of the reference path.

The usefulness of the invention may be illustrated by an example in which a laser source is used to measure distance. A laser source with proper wavelength is selected so as to produce the maximal sensitivity for the optical Doppler frequency sensor in this invention. Based on the characteristics of the laser source, a dispersive mechanism, for example, a stretch of optical fiber, grating pairs, or direct modulation of bias current, is then adopted to produce frequency-chirped light emission from the laser source. The desired frequency chirp rate in the laser emission is achieved by controlling the characteristics of the dispersive mechanism, for example, length of the fiber or the modulation amplitude and frequency of the diode laser drive current. After the desired frequency chirp rate is achieved, the laser emission is split into two branches by the beam splitting element. The reference beam travels through the reference path and impinges onto the said photosensor. The probe beam is projected towards the target under investigation and the reflected light is collected and brought to interference with the reference beam inside the photosensor. The photocurrent generated by the photosensor can be converted into voltage signal using a transimpedance amplifier. The voltage signal can then be read out using a regular volt-meter, for example, HP34420A meter.

The following experiment demonstrates that the photosensor in this invention can indeed generate photocurrents linearly proportional to the path length difference between the reference and probe paths. A mirror mounted on a piezo-electric translator has been used as the remote target. The position of the mirror and hence the length of the probe path can be readily manipulated by varying the voltage applied to the piezo-electric translator. Using the volt-meter to read out the voltage output from the transimpedance amplifier as the position of the mirror is adjusted, the voltage versus displacement characteristic curve shown in FIG. 7 can be obtained.

The aforementioned procedure of determining the characteristic voltage versus displacement curve serves as the calibration process of the distance measurement apparatus in this invention.

The slope of the voltage versus displacement characteristic curve is the proportionality constant to be used to decipher the distance information from the measured voltage data. That is, by dividing the measured voltage by the proportionality constant, the distance difference between the reference and probe paths can be readily determined.

The foregoing examples of the use of the invention show that the system and methodology of the invention are adaptable to the measurement of optical path lengths, and therefore distances, he with great accuracy over a wide range of distances, and without a priori knowledge of the approximate distance to be measured (i.e., the system is capable of autoranging).

While a specific embodiment of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

What is claimed is:

1. A device for measuring optical path length comprising:
   an electromagnetic source that emits frequency chirped electromagnetic radiation;
   a dispersive means for causing the various spectral components of the frequency-chirped electromagnetic radiation to emerge at different times;
   means for splitting the dispersed and frequency chirped beam of light into two beams, a local reference beam and a probe beam;
   a first optical path of fixed length through which the local reference beam travels;
   a second optical path through which the probe beam travels;
   an optical frequency sensor for receiving the local reference beam and the probe beam, measuring the motion of an interference pattern between the reference beam and the probe beam, and generating photocurrents that are linearly proportional to the relative frequency difference between the reference beam and the probe beam.

2. A device as in claim 1 wherein the dispersive means is an external stretch of optical fiber or grating pairs.

3. A device as in claim 1 wherein the dispersive means is direct modulation of the bias circuit of the laser source.

4. A device as in claim 2 wherein the optical frequency sensor is a semiconductor device.

5. A device as in claim 2 wherein an alternating external bias electric field is applied to the optical frequency sensor to manipulate the magnitude of the generated photocurrents.

6. A device as in claim 1 wherein said electromagnetic source is a broadband continuous-wave light source.

7. A device as in claim 6 wherein said continuous-wave light source is a light-emitting diode.

8. A device as in claim 1 wherein said interference pattern is-detected by means for detecting an interference pattern comprising a transimpedance amplifier with a feedback resistor that produces voltage signals.

9. A device as in claim 8 wherein said means for detecting an interference pattern comprises a lock-in amplifier.

10. A device as in claim 1 wherein said electromagnetic source comprises a laser and wherein said electromagnetic radiation comprises a laser pulse.

11. A method for measuring optical path length comprising the steps of:
   emitting a frequency-chirped laser pulse, a laser pulse with short time duration, having various spectral components to a dispersive means;
   dispersing the laser pulse by causing the various spectral components of the frequency-chirped laser pulse to emerge at different times;
   splitting the dispersed and frequency-chirped beam of light into two beams, a local reference beam and a probe beam;
   sending the local reference beam through a first optical path of known length;
   sending the probe beam through a second optical path to be measured;
   receiving the local reference beam and the probe beam;
   measuring the motion of an interference pattern between the reference beam and the probe beam, and generating photocurrents that are linearly proportional to the relative frequency difference between the reference beam and the probe beam.

12. A device for measuring optical path length comprising:
- a laser source that emits a laser pulse having various spectral components;
- an external stretch of optical fiber that receives the laser source and causes the various spectral components of the laser pulse to emerge at different times;
- a beam splitter for splitting the pulse into two beams, a local reference beam and a probe beam;
- a first optical path of fixed length through which the local reference beam travels to the optical frequency sensor;
- a second optical path through which the probe beam travels to the optical frequency sensor;
- an optical frequency photosensor comprising a semiconductor device that senses the motion of the optical interference pattern and generates photocurrents that are linearly proportional to the relative frequency difference between a local reference beam and a probe beam based on the moving charge field effects of the semiconductor device; and
- an electric circuit attached to the output of the frequency sensor that produces a voltage signal.

13. A device as in claim 12 wherein the electric circuit is a transimpedance amplifier with a feedback resistor or is a lock-in amplifier.

14. A device for measuring optical path length comprising:
- a semiconductor diode laser source wherein the laser bias current is modulated so as to cause various spectral components of the laser pulse to emerge at different times;
- a beam splitter for splitting the pulse into two beams, a local reference beam and a probe beam;
- a first optical path of fixed length through which the local reference beam travels to the optical frequency sensor;
- a second optical path through which the probe beam travels to the optical frequency sensor;
- an optical frequency photosensor comprising a semiconductor device that senses the motion of the optical interference pattern and generates photocurrents that are linearly proportional to the relative frequency difference between a local reference beam and a probe beam based on the moving charge field effects of the semiconductor device; and
- an electric circuit attached to the output of the frequency sensor that produces a voltage signal.

15. A device as in claim 14 wherein the electric circuit is a transimpedance amplifier with a feedback resistor that produces voltage signals.

16. A device as in claim 14 wherein the electric circuit is a transimpedance amplifier with a feedback resistor or is a lock-in amplifier.

17. A device as in claim 14 wherein an alternating external bias electric field is applied to the optical frequency sensor to manipulate the magnitude of the generated photocurrents.

18. A method for measuring optical path length comprising the steps of:
- emitting a frequency-chirped laser pulse having various spectral components;
- dispersing the laser pulse by causing the various spectral components of the frequency-chirped laser pulse to emerge at different times;
- splitting the laser pulse into two beams, a local reference beam and a probe beam;
- sending the local reference beam through a first optical path of fixed length to the frequency sensor;
- sending the probe beam through a second optical path to the frequency sensor;
- using an optical frequency photosensor semiconductor device to sense the motion of the optical interference pattern, and generate photocurrents that are proportional to the frequency difference between the local reference beam and the probe beam; and
- producing a voltage signal using an electric circuit attached to the output of the frequency sensor.

19. A device for measuring optical path length with long observation range comprising:
- a laser beam source that produces laser pulses of finite duration;
- a dispersive mechanism which causes the spectral components of said laser pulses to emerge from said source at different times, thereby producing ramping in the laser frequencey and generating a dispersed and frequency-chirped laser pulse;
- a beam splitter for splitting the pulse into two beams, a local reference beam and a probe beam;
- a first optical path of fixed length through which the local reference beam travels to the optical frequency sensor;
- an acousto-optic frequency shifter through which the local reference beam travels to the optical frequency sensor and modifies the frequency of the reference laser beam;
- a second optical path through which the probe beam travels to the optical frequency sensor;
- an optical frequency photosensor comprising a semiconductor device that senses the motion of the optical interference pattern formed by the interference between the probe and the frequency-shifted reference pulses, said photosensor generating photocurrents that are proportional to the frequency difference between the reference beam and the probe beam based on the moving charge field effects of the semiconductor device; and
- an electric circuit coupled to the output of the frequency sensor so as to produce a voltage related to said output.

20. A device for measuring optical path length over large observation ranges, comprising:
- a laser source which emits initial laser pulses with short time duration to a dispersive mechanism;
- a dispersive mechanism which causes various spectral components of the initial laser pulses to emerge from said mechanism at different times, thereby producing ramping in laser frequency and generating a dispersed and frequency-chirped laser pulse;
- a beam-splitting device for receiving the dispersed and frequency-chirped laser pulse and generating therefrom a local reference beam and a probing signal;
- a first optical path through which the local reference beam travels, and a second optical path of length significantly different from the first optical path through which the probe beam travels, leading to an optical frequency sensor; and
- an optical frequency sensor based on moving space charge field effects in a semiconductor material, for receiving the local reference beam and the probing signal, sensing an interference pattern formed between different pulses of the reference beam and the probe pulse trains, and generating photocurrents linearly proportional to the difference frequency between the local reference beam and the probing signals.

* * * * *